United States Patent [19]

Hienerwadel

[11] Patent Number: 5,172,334
[45] Date of Patent: Dec. 15, 1992

[54] CIRCUIT ARRANGEMENT FOR DEFINING THE POSITIONS OF EXTREMA OF A CORRELATION FUNCTION

[75] Inventor: Klaus Hienerwadel, Nuremberg, Fed. Rep. of Germany

[73] Assignee: U.S. Philips Corp., New York, N.Y.

[21] Appl. No.: 671,325

[22] Filed: Mar. 19, 1991

[30] Foreign Application Priority Data

Mar. 26, 1990 [DE] Fed. Rep. of Germany ....... 4009610

[51] Int. Cl.$^5$ ............................................. G06F 15/31
[52] U.S. Cl. .......................... 364/724.03; 364/728.03; 364/715.06
[58] Field of Search ...................... 364/724.03, 728.03, 364/728.06, 715.06

[56] References Cited

U.S. PATENT DOCUMENTS

| | | | |
|---|---|---|---|
| 4,430,722 | 2/1984 | Massen et al. | 364/728.06 |
| 4,757,464 | 7/1988 | Zimmermann et al. | 364/715.06 |
| 4,819,197 | 4/1989 | Blais | 364/715.06 |
| 4,972,441 | 11/1990 | Roberts et al. | 364/728.03 X |
| 5,020,113 | 5/1991 | Lo et al. | 364/728.03 X |
| 5,046,179 | 9/1991 | Uomori et al. | 364/728.03 |

Primary Examiner—Tan V. Mai
Attorney, Agent, or Firm—Steven R. Biren

[57] ABSTRACT

A circuit arrangement for defining the positions of extrema of a correlation function includes a memory (1), an address control unit (3) and a correlator (2). The elaborate computations for defining correlation functions can be reduced by the circuit arrangement described. The correlation function is an example. Two functions are present in digital form. Their sampling values are stored in the addressable memory (1). The address control unit (3) generates addresses by which the functions stored in the memory (1) are read in a sub-sampled manner. With these sub-sampled functions the extrema and their positions are defined in a first step by the correlator (2) and the address control unit (3). Proximate to an extremum thus defined the variation of the correlation functions is examined more precisely in this proximity in a smaller sub-sampling ratio and the extremum in this proximity is redefined. This process can be repeated with an increasingly smaller sub-sampling ratio.

2 Claims, 2 Drawing Sheets

CIRCUIT ARRANGEMENT FOR DEFINING THE POSITIONS OF EXTREMA OF A CORRELATION FUNCTION

BACKGROUND OF THE INVENTION

The invention relates to a circuit arrangement for defining the positions of extrema of a correlation function of two signals which are present in a digital form.

A circuit arrangement of this type can be used, for example, for measuring the shift of two speech signals as a function of time. In such a case the two signals, whose correlation is to be determined, are only dependent on one (time) variable. Also the correlation function itself is a function of one variable only, namely of the mutual time shift of the two signals.

An example of using signals which are dependent on two variables is found in picture encoding. In order to reduce the bit rate in a picture encoder (cf., for example, DE 37 26 520 A1), it is checked which section of a picture already transmitted (first signal) is most correlative with a section (second signal) of the actual picture. In this case the signals are functions of two coordinates and the correlation function is a function of the two shifts, each in a direction of the two coordinates axes.

For the sake of formal simplicity the following description will only consider the case in which the signals are dependent on one variable, because an extension to a plurality of variables will be evident to those skilled in the art.

The correlation function A of two signals f and g which are present in a digital form is herein understood to mean any function of the type $$A(\mu) = k \sum_{i=0}^{b-1} F[f(i), g(i - \mu)]; \quad -p \leq \mu \leq +p \quad (1)$$

in which k is a normalization constant, i and $\mu$ are integers, while f(i) and g(i−$\mu$) represent the sampling values of the functions f and g at the instants which are symbolized by the integral numbers i and i−$\mu$. A($\mu$) is then a sampling value of the correlation function at the instant $\mu$. $\mu$ is simultaneously the shift of the function g with respect to its original position. The number of the shifts $\mu$ considered is limited: $\mu$ may assume any integral number between −p and p, where p is also an integral number and may have different values from case to case. p defines the so-called search range in which, for example, an extremum of A($\mu$) is searched. F denotes a combination of the two functions f and g which is not further identified. The reference b denotes the number of the terms of the sum in (1).

When evaluating formula (1), the arguments of the function can also be interpreted as symbols of the memory addresses under which the relevant sampling values are stored. The relevant interpretation will be evident from the context and will not be explicitly mentioned.

Use of the product of the functions f and g for the combination F results in the correlation function of the two functions f and g. The two functions f and g have their greatest correlation for that value of the shift $\mu$ for which the correlation function assumes its maximum value.

If the value itself or the square value of the difference is used for F, the functions f and g have their greatest correlation for that value of $\mu$ for which A($\mu$) assumes a minimum value. The choice of the combinations F in individual cases is dependent on the attendent circumstances of the case and will not be further discussed.

Not only are the largest or the smallest value of the correlation function A($\mu$) and its position $\mu_e$ frequently important, but also the next smaller values in the case of a maximum and the next larger values in the case of a minimum, as well as the positions of these values. The extreme value combined with the next values—as mentioned hereinbefore—will be referred to as extrema.

In the direct evaluation of formula (1), 2pb+b times the combination F for different values of the functions f and g is to be defined when defining the extrema and their positions. This may involve elaborate computations in many applications.

SUMMARY OF THE INVENTION

It is an object of the invention to provide a circuit arrangement of the type described above with which the elaborate computations for defining the extrema and their positions of the correlation function are considerably reduced.

BRIEF DESCRIPTION OF THE DRAWING

An embodiment of the invention will be described in greater detail with reference to the Figures, in which.

DESCRIPTION OF THE PREFERRED EMBODIMENTS

Figure 1:
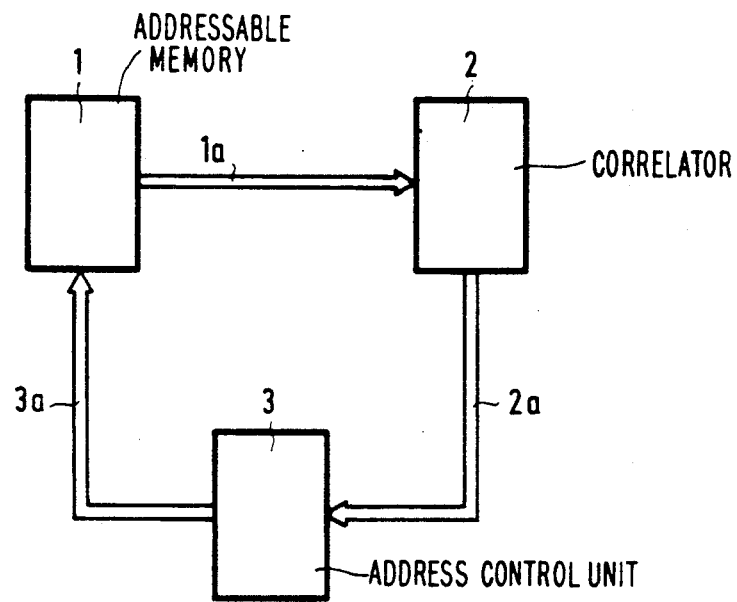
FIG. 1 is a block diagram of the circuit arrangement according to the invention.

The central component of the circuit arrangement of FIG. 1 is an address control unit 3 which controls the writing and reading processes of a write-read addressable memory 1 via address lines 3a by computations of write and read addresses. The writing process is irrelevant for the explanation of the invention and will not be further described.

In this example the reference b in formula (1) has the value 16 and p has the value 8. Sampling values of f are stored under first addresses 0 to 15 in the memory 1 and sampling values of g are stored under second addresses—8 to 23.

Figure 2:
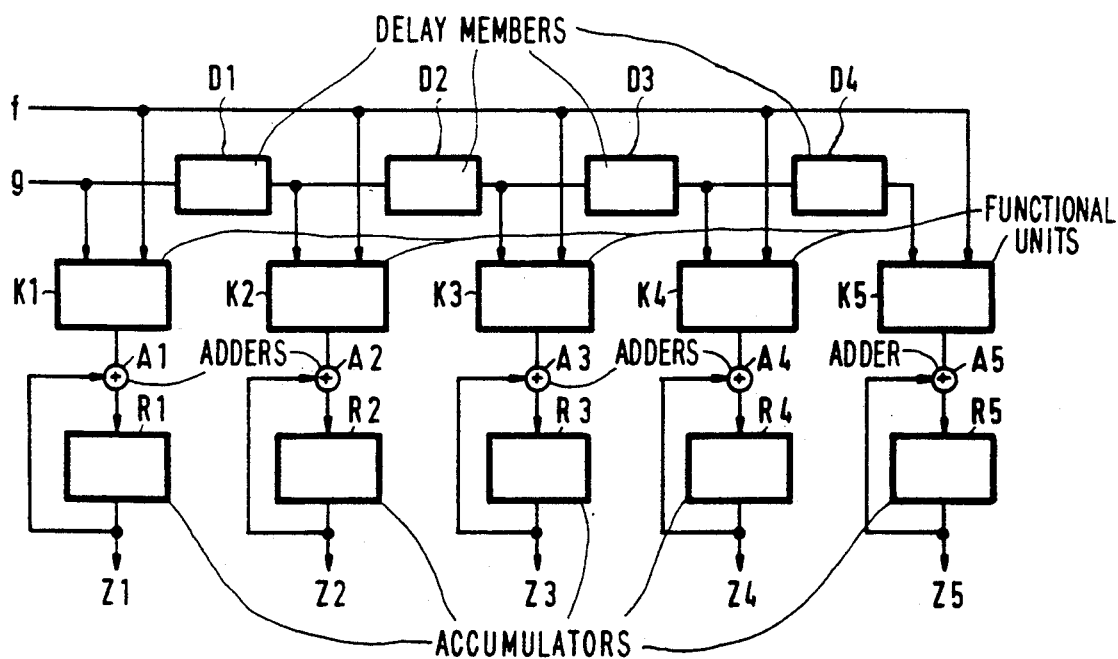
FIG. 2 shows a known correlator as can be used in the circuit arrangement according to the invention.
Figure 3A:
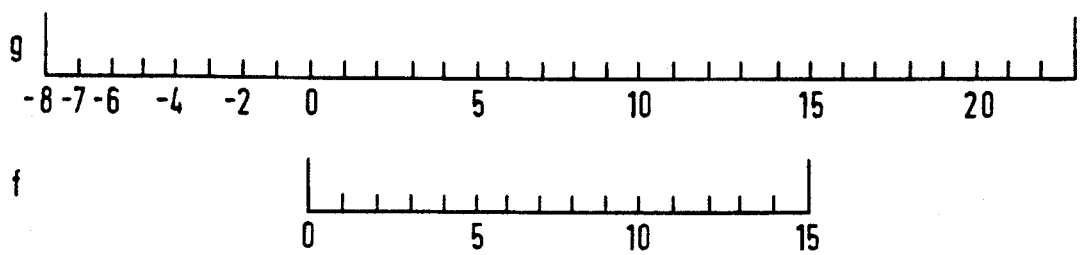
FIGS. 3a-3c show diagrams to explain the operation of the circuit arrangement according to the invention.

FIG. 3a shows two superposed scales, one for g and one for f. The numbers on the scales indicate the addresses under which sampling values of g and f are stored in the memory 1. The evaluation of formula (1) can be illustrated by means of FIG. 3a in such a way that the sampling values of g and f which are stored under superposed addresses are multiplied by each other (thus F denotes the multiplication in the example) and the single products are then added. Since nominally equal addresses are one below the other, the relative position of the two scales shown in FIG. 3a implies that the shift $\mu$ in formula (1) has the value 0. If $\mu$ is chosen to be 1, the lower scale should be moved to the left by one scale unit in order that the interpretation can remain the same. The starts of the scale are superposed for $\mu = p = 8$ and the ends of the scale are superposed for $\mu = -p = -8$. If the sampling values of g and f are simultaneously read from the memory 1—under the control of the address control unit 3—in an ascending sequence of the addresses (starting at g(−8) and f(0)) and applied to the inputs of a (known) correlator according to FIG. 2, the sampling values A(8) to A(−8) of the correlation function are obtained at the outputs of the correlator at the end of this reading process, provided that the correlator according to FIG. 1 comprises 17 stages and that the sampling values of f are read cyclically. In FIG. 3a this implies that the lower scale is step-wise shifted from the lower left edge to the upper right edge.

This procedure corresponds to the direct evaluation of formula (1). The output data of the correlator 2 are applied to the address control unit 3 via a line 2a, which unit comprises means with which the extrema of the values A(8) to A(−8) are determined by way of comparison. The position of, for example, an extremum can be unambiguously recognized at that output of the correlator 2 at which it has occurred.

Figure 3B:
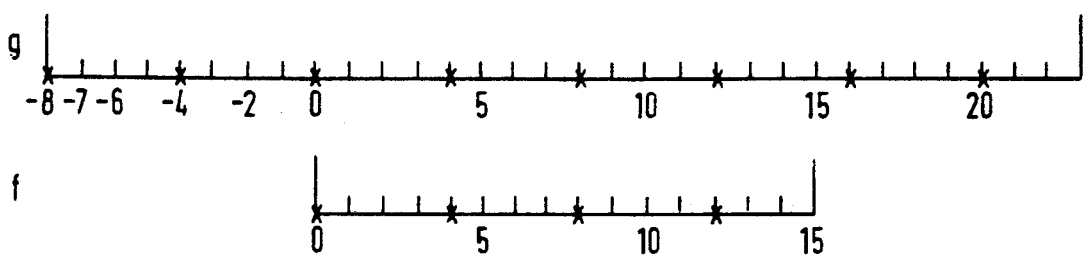
Figure 3C:
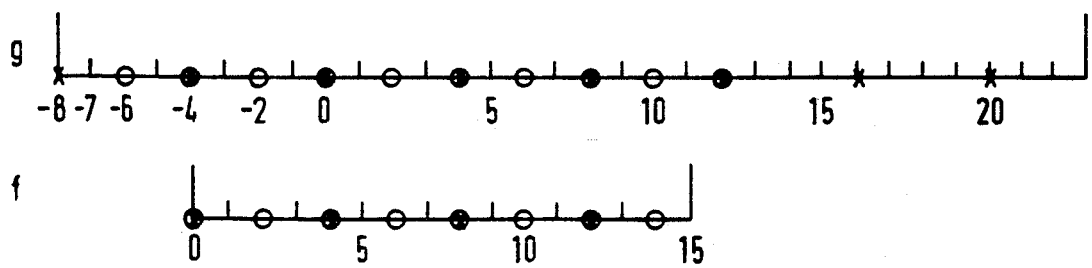

It will be evident that for a value of p which is even larger than in this example the number of stages of the correlator will become very large if the direct evaluation of (1) is to be maintained. According to the invention, the following procedures are used for a value of p. The two signals are sub-sampled in a ratio of 1:4, i.e. the address control unit 3 ensures that only every fourth sampling value of the stored sampling values is read and is applied to the correlator 2. In FIG. 3b the values which are read in this case are provided with a cross. All values provided with a cross are read again and are applied to the correlator 2, starting from the extreme left cross in the two scales. The values A(8), A(4), A(0), A(−4) and A(−8) are then present at the outputs of the correlator 3, though not with the maximal accuracy. If A(4) is the extremum of these values, i.e. its position is $\mu e1 = 4$, this result can be represented by a position of the two scales as illustrated in FIG. 3c.

A more precise sub-sampling, namely 1:2 is now chosen and, starting from the previously found position $\mu e1 = 4$ of the extremum, the search for the extremum is continued in the proximity of this position. The sampling values now read by the address control unit 3 are encircled, as is shown in FIG. 3c. Reading of all encircled values is effected from left to right again. The correlator 3 then supplies the sampling values. A(6), A(4) and A(2). If A(6) is the extremum in this case, no sub-sampling is used any longer in a last search, but the sampling is limited to A(7), A(6) and A(5).

The circuit arrangement according to FIG. 1 generally operates as follows:

In the address control unit an integer n1 is stored which is divisor of p and divisor of b. The address control unit replaces the control variable i by n1*i1 and the shift $\mu$ by n1*$\mu$1. The control variable i1 passes through all integral values from 0 to b1−1, where b1=b/n1 and $\mu$ passes through all integral values from −p1 to +p1, where p1=p/n1. The address control unit 3 now generates the addresses of f and g thus computed in an ascending sequence. The associated sampling values are applied to the correlator 2 which computes the values A(−n1p1), A(−n1(p1−1)) to A(n1p1).

The address control unit 3 thus determines the extremum of the correlation function and the associated shift (position) of this value v0=n1*$\mu$1e.

An integer n2, which is divisor of n1 and divisor of b, is stored in the address control unit. The address control unit 3 replaces the argument of f in (1) by n2*i2 and the argument of g by n2*i2−n2*$\mu$2+vO. i2 passes through all integral values from 0 to b/n2−1 and $\mu$2 passes through all integral values from −n1/n2−1 to n1/n2−1. The addresses thus obtained are again passed on to the memory 1 in an ascending sequence and the associated sampling values are then applied to the correlator 2. If the address control unit has determined by way of comparison for which value of $\mu$2 A assumes an extremum, the position v of this extremum will be v1=v0+n2*$\mu$2.

This position of the extremum is now either further used as the final value or the steps performed are repeated in an even small sub-sampling ratio.

In the correlator of FIG. 2 the sampling values of f are applied to the upper input line with a clock which is not further defined and the sampling values of g are applied to the line including delay members D1, D2, D3 and D4. Functional units K1 to K5 ensure the function F in accordance with formula (1) between their input data. The values of this function are continuously added by means of adders A1 to A5 and accumulators R1 to R5 so that sampling values of the correlation function are obtained at the outputs Z1 to Z5.

I claim:

1. A circuit arrangement for defining the positions of extrema of a correlation function of two signals which are present in a digital form, in order to determine a correlation between said signals, which comprises:
   an addressable memory having an input and an output, in which the values of the signals are stored at predetermined locations in memory addresses;
   an address control unit having an input and an output coupled to the input of said addressable memory for controlling the writing and reading processes of said addressable memory;
   a correlator having an input and an output, the output of said addressable memory being coupled to said correlator input and said correlator output being coupled to the input of said address control unit;
   means by which the values of the correlation function computed by the correlator and their associated locations are stored, and means by which the extrema of the correlation function computed by the correlator are obtained by way of comparison;
   the address control unit generating addresses by which the signals sub-sampled in a ratio of 1:n1 are applied to the correlator, the positions of the extrema defined by means of these sub-sampled signals being stored, the address control unit generating addresses by which the signals sub-sampled in a ratio of 1:n2, with the value of the number n2 being smaller than the number n1, are applied to the correlator and which are required only for determining the variation of the correlation functions of a predetermined proximity of the previously determined extrema positions, and in the extrema positions of the correlation function in the predetermined proximity being redefined by means of the signals sub-sampled in a ratio of 1:n2.

2. A circuit arrangement as claimed in claim 1, characterized in that the address control unit repeats the indicated steps in an increasingly smaller sub-sampling ratio.

* * * * *